(12) United States Patent
Tiemann

(10) Patent No.: US 6,386,096 B1
(45) Date of Patent: May 14, 2002

(54) ADJUSTABLE RACK FOR ROASTING FOWL IN INVERTED POSITION

(75) Inventor: Frank Tiemann, Braham, MN (US)

(73) Assignee: T & L Nifty Products, Inc., Braham, MN (US)

( * ) Notice: Subject to any disclaimer, the term of this patent is extended or adjusted under 35 U.S.C. 154(b) by 0 days.

(21) Appl. No.: 09/668,492

(22) Filed: Sep. 25, 2000

(51) Int. Cl.[7] .......................... A47J 37/00; A47J 37/04; A47J 37/12; A47J 43/00; A47J 43/08
(52) U.S. Cl. .......................... 99/426; 99/449; 211/181.1
(58) Field of Search ............... 99/339, 340, 419–421 V, 99/426, 427, 447–450; 211/181.1; D7/409

(56) References Cited

U.S. PATENT DOCUMENTS

| | | |
|---|---|---|
| 2,214,137 A | 9/1940 | Irwin et al. |
| 3,665,843 A | 5/1972 | Moore |
| 4,848,217 A | 7/1989 | Koziol |
| 5,106,642 A | 4/1992 | Ciofalo |
| 5,791,235 A | 8/1998 | Anselmo |

*Primary Examiner*—Timothy F. Simone
(74) *Attorney, Agent, or Firm*—James R. Cwayna

(57) ABSTRACT

A roasting rack for various fowls including a base with pivotal and adjustable support members thereon, which members form a supporting V-frame with each member arranged to receive a portion of the anatomy, such as the wings, of the fowl such that the fowl is positionable, breast down, onto the V-frame. The members forming the frame are positionable for adjustment in accordance with the size of the fowl being roasted.

1 Claim, 3 Drawing Sheets

ADJUSTABLE RACK FOR ROASTING FOWL IN INVERTED POSITION

RELATED APPLICATIONS

Applicant has no and is not aware of any pending applications directed towards the subject matter of this application.

RESEARCH AND DEVELOPMENT

Applicant has conceived and developed this invention by his own efforts and the invention was not made under Federal or Independent sponsored conditions.

PRIOR ART

The applicant has searched and reviewed the prior art and has disclosed the prior art references on the required Information Statement Disclosure form or its equivalent.

SHORT SUMMARY OF THE INVENTION

A roasting rack particulary designed for the roasting of fowl in an oven or otherwise cooking the fowl while the fowl is positioned in a breast down or inverted orientation. The rack includes adjustment features to accommodate fowl carcasses of various sizes and provides for support of the carcass through the wings and other body portions.

The rack includes a base having a pair of longitudinally spaced, perforate ends, and a pair of side frame members which are pivotally mounted to the ends of the base, each provided with a positioning arm which is receivable into selected ones of the spaces on the perforate ends to control spacing between the side frames.

Each of the frame members includes a wing locating depression such that the wing of the fowl is positioned therein The frame members also include longitudinally extending bars to support the breast of the fowl.

BACKGROUND AND OBJECTS OF THE INVENTION

A common way to roast any fowl is to simply position the same on its back upon a selected rack. Applicant has found that this positioning method often results in the breast of the fowl being overly done and the meat on the back of the fowl adhering to the surface upon which it has been resting.

Some racks have been provided that do allow for inverted positioning of the fowl but Applicant has found that such racks often position the fowl directly on the breast and allow the wings of the fowl to droop or sag or require propping of the sides to maintain a level position for the carcass.

With the Applicant's rack, as disclosed herein, the fowl is held in a breast down position with such position being maintained by a pair of adjustable frames such that the fowl remains elevated above any directly or indirectly heated surface and which, being adjustable, will accommodate fowl of various sizes.

It is therefore an object of the Applicant's invention to provide a roasting rack for fowl herein the fowl is maintained in a breast down or inverted position It is a further object of the Applicant's invention to provide a roasting rack for fowl wherein the fowl is maintained in a breast down position and the wings of the fowl are utilize to insure such position.

It is still a further object of the Applicant's invention to provide an adjustable rack for the roasting of fowl in an inverted or breast down position wherein the wings of the fowl provide a primary support and additional means are provided to support the breast portion of the fowl.

These and other objects and advantages of the invention will more fully appear from a consideration of the accompanying drawings and following disclosure of the invention.

SHORT DESCRIPTION OF THE DRAWINGS

DESCRIPTION OF A PREFERRED EMBODIMENT OF THE INVENTION

Figure 1:
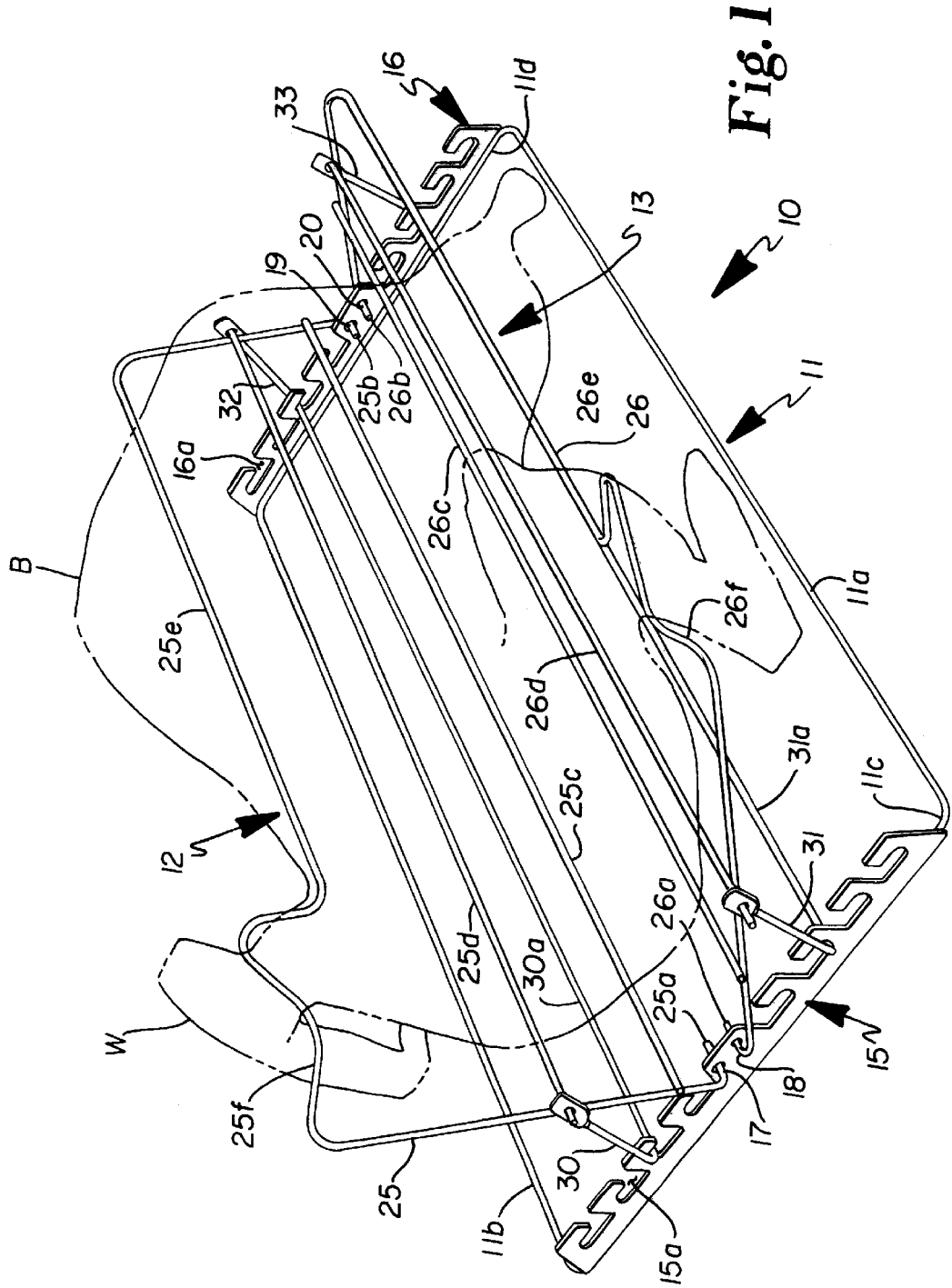
FIG. 1 is a perspective view of the rack embodying the concepts of the Applicant's invention with a fowl carcass, shown in dotted lines, positioned thereon to illustrate use of the invention and positioning of the carcass thereon during use.
Figure 2:
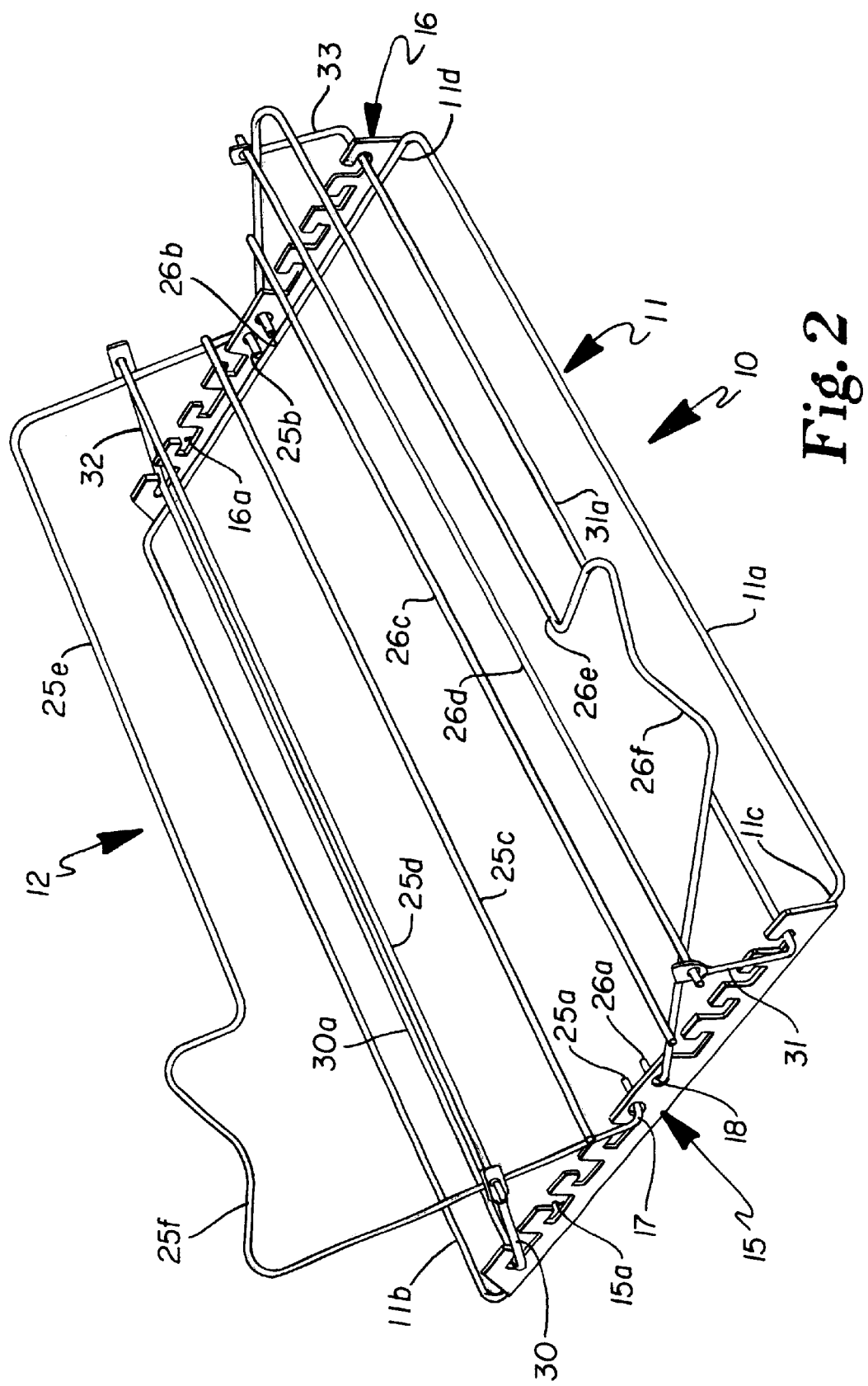
FIG. 2 is a view identical to FIG. 1 eliminating the fowl carcass.
Figure 3:
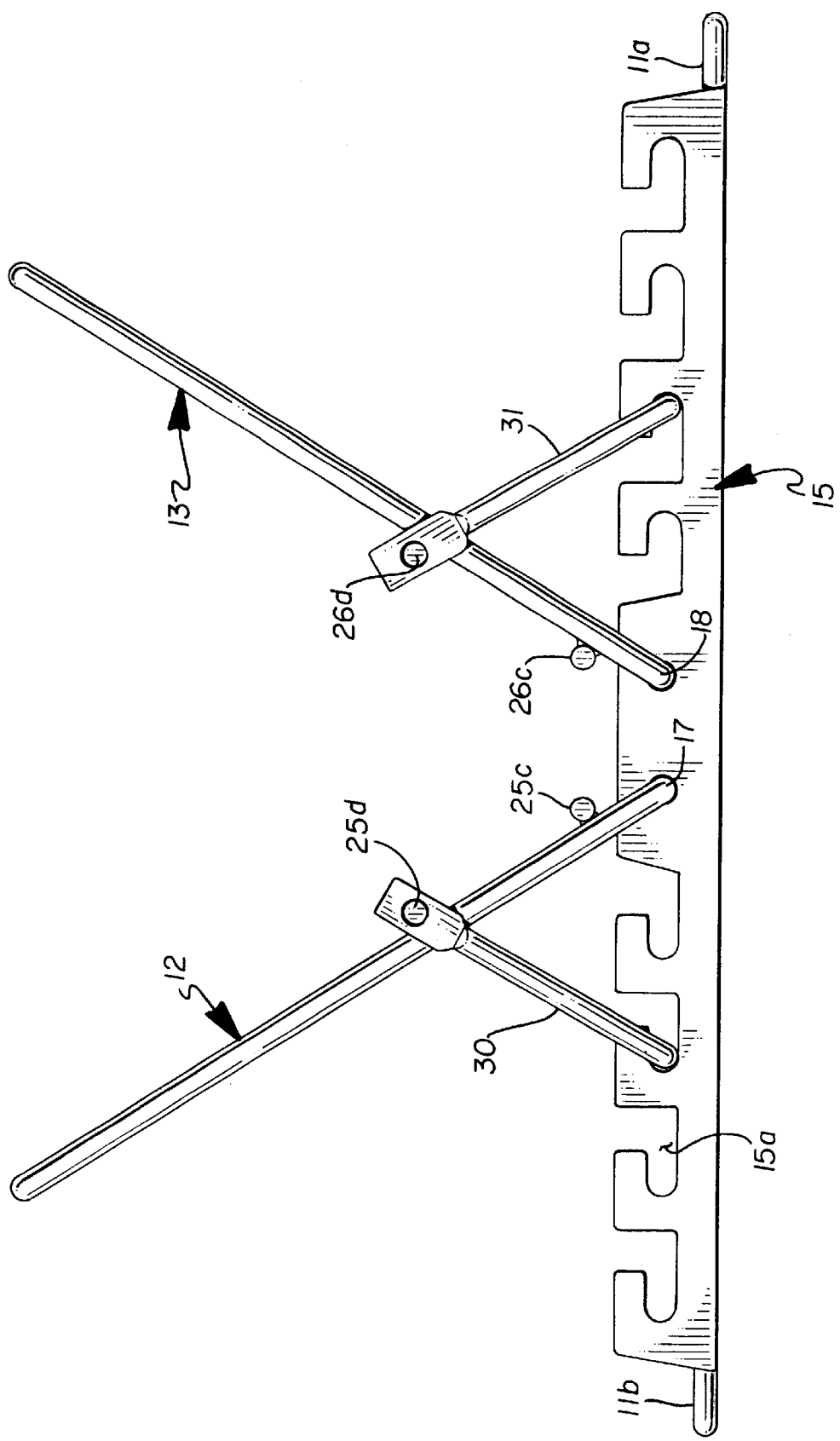
FIG. 3 is an end view of the rack, particularly illustrating the adjustability of the carcass supporting frames.

In accordance with the accompanying drawings, the roasting rack embodying the concepts of the Applicant's invention is designated in its entirety 10 and basically consists of a bottom frame 11 and a pair of adjustable carcass support frames 12, 13 which are independently adjustable upon the bottom frame 11. The carcass of a fowl is illustrated, in dotted lines, in the position that it would be placed for roasting in FIG. 1 with the body designated B and the wings designated W.

Bottom frame 11 includes a pair of side struts 11a, 11b and a pair of end plates 15, 16. Additionally, the sides struts 11a, 11b may include cross struts 11c, 11d at the ends thereof to which the end plates 15, 16 are secured.

As illustrated, the end plates 15,16 each consist of a generally upright member having a plurality of spaced, carcass Each positioning passages, such passages being designated 15a on end 15 and 16a on end 16. Each of such passages 15a, 16a include an L-shaped opening and a plurality of such passages are provided on each end 15, 16 to be positioned in spaced relation along the entire length of such ends 15, 16. As illustrated, the passages 15a, 16a on each side of a center of the ends 15, 16 are disposed in opposed directions. In addition to such carcass frame positioning passages 15a, 16a, a pair of carcass frame receiving and locating passages 17, 18, 19, 20 are provided generally centrally of each of such end plates 15, 16 to provide a carcass frame rotation point for such frames 12, 13.

Each of the carcass supporting frames 12, 13 include a generally U-shaped member 25, 26 having locating ends 25a, 25b, 26a, 26b to be received in the frame rotation point passages 17, 8, 19, 20. In this manner the frames 12, 13 have one secured to the ends 15, 16 of the bottom frame 11 of the roaster 10.

A plurality of longitudinally extending carcass supports 25c, 25d, 26c, 26d may be provided within the legs of the formed U-shaped carcass support frames 12, 13.

As illustrated, the outer longitudinal strut 25e, 26e of the formed U-shaped frames 12, 13 has a formed, depressed area 25f, 26f adjacent one end thereof. These depressed areas 25f, 26f are within the plane established by the other elements of such frames 12, 13 and as illustrated in FIG. 1 will serve as wing position areas for positioning the fowl on the rack.

Means for adjusting the attitude of the carcass supporting frames 12, 13 is provided through an outstanding, U-shaped leg 30, 31, 32, 33 which is rotatably connected to the end of one of the longitudinally extending carcass support struts 25d, 26d or which may simply be attached to any convenient carcass supporting frae 12, 13 portion.

As should be obvious, the ends of these U-shaped legs 30, 31, 32, 33, connected by longitudinal struts 30a, 31a are receivable into selected ones of the L-shaped openings 15a, 16a of the ends 15, 16. With this construction, it should be obvious that each carcass support Same 12, 13 of the unit 10 is independently positionable, although in use, they would probably be positioned in corresponding openings 15a, 16a to maintain the carcass in a level condition.

In use, the frames 12, 13 are positioned such that the wings W of the fowl are arranged and supported in the depressed areas 25f, 26f of frames 12, 13 and the body B of the fowl will be supported by the longitudinal struts 25c, 25d, 26c, 26d of the frames 12, 13.

It should be obvious that Applicant's roasting rack provides support for a fowl being roasted without requiring attachment of penetration thereof to further preserve the liquid normally contained in the fowl.

Therefore it should be obvious that Applicant has provided a new and unique roasting rack for roasting of fowl which relies upon the positioning of the wing of a fowl to maintain the remainder of the body in a manner to preserve the ordinary fluids of the fowl and which further substantially reduces the skin of the fowl from coming into contact with large surface areas of the rack or other means for positioning such a carcass.

What is claimed is:

1. A roasting rack for roasting carcasses of fowl in an inverted or breast down position, including:

a) a longitudinally extending base having a pair of generally upright ends;

b) a plurality of locating and positioning apertures provided on each of said ends;

c) a pair of longitudinally extending carcass support frames being rotatably positioned on said ends of said base for shifting relative to said base;

d) each of said supporting frames including a rotatably mounted leg for positioning within one of said positioning apertures for shifting the position of said frames relative to said base;

e) each of said supporting frames including at least a pair of longitudinally extending carcass supports;

f) each of said supporting frames also including an upper carcass support in planar alignment with said pair of longitudinally extending carcass supports; and, g) said upper carcass support having a smoothly formed, depressed area, formed in planar alignment with said pair of longitudinally extending carcass supports, located adjacent one end or said frame for receiving a wing of the carcass therein.

* * * * *